(12) United States Patent
Edwards et al.

(10) Patent No.: US 12,014,371 B2
(45) Date of Patent: Jun. 18, 2024

(54) SYSTEMS AND METHODS FOR FRAUD DETECTION AND PREVENTION

(71) Applicant: Capital One Services, LLC, McLean, VA (US)

(72) Inventors: Joshua Edwards, Philadelphia, PA (US); Abdelkader Benkreira, New York, NY (US); Michael Mossoba, Arlington, VA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 415 days.

(21) Appl. No.: 16/893,893

(22) Filed: Jun. 5, 2020

(65) Prior Publication Data

US 2021/0383392 A1 Dec. 9, 2021

(51) Int. Cl.
*G06Q 20/40* (2012.01)
*G01C 21/20* (2006.01)
(Continued)

(52) U.S. Cl.
CPC ......... *G06Q 20/4016* (2013.01); *G01C 21/20* (2013.01); *G06F 16/909* (2019.01);
(Continued)

(58) Field of Classification Search
CPC ........... G06Q 20/4016; G06Q 20/4015; G06Q 30/0185; G06Q 50/265; G06Q 20/384;
(Continued)

(56) References Cited

U.S. PATENT DOCUMENTS 9,177,130 B2   11/2015  Nechyba et al.
10,043,182 B1 *  8/2018  Bharghavan ....... G06Q 20/3224
(Continued)

FOREIGN PATENT DOCUMENTS

WO   WO-2014145395 A2 *  9/2014  ........... G06Q 20/384

OTHER PUBLICATIONS

Demiriz et al (Using Location Aware Business Rules for Preventing Retail Banking Frauds) (Year: 2015).*

*Primary Examiner* — John W Hayes
*Assistant Examiner* — Wodajo Getachew
(74) *Attorney, Agent, or Firm* — TROUTMAN PEPPER HAMILTON SANDERS LLP; Christopher J. Forstner; John A. Morrissett

(57) ABSTRACT

Systems and methods for fraud detection and prevention is disclosed. The system may receive a transaction request for a first customer including a transaction location, transaction time stamp, and merchant type code. The system may determine whether the transaction location is expected for the first customer. When the transaction location is unexpected, the system may identify a last-known video detection having a last-known time stamp and last-known location. The system may determine a travel time estimate between the last-known location and the transaction location and determine a buffer based on the merchant type code. The system may compare the travel time estimate to an allotted time that includes a difference between the transaction time stamp and last-known time stamp less the buffer. When the travel time estimate exceeds the allotted time, the system may execute one or more fraud prevention steps.

8 Claims, 7 Drawing Sheets

(51) Int. Cl.
*G06F 16/909* (2019.01)
*G06Q 20/38* (2012.01)
*G06Q 30/018* (2023.01)
*G06Q 50/26* (2012.01)
*G06V 20/52* (2022.01)
*G06V 40/16* (2022.01)
*H04L 9/40* (2022.01)
*G06F 16/23* (2019.01)

(52) U.S. Cl.
CPC ..... *G06Q 20/4015* (2020.05); *G06Q 30/0185* (2013.01); *G06Q 50/265* (2013.01); *G06V 20/52* (2022.01); *G06V 40/16* (2022.01); *H04L 63/107* (2013.01); *G06Q 20/389* (2013.01); *G06Q 20/405* (2013.01); *H04L 63/08* (2013.01); *H04L 2463/082* (2013.01); *H04L 2463/102* (2013.01); *H04L 2463/121* (2013.01)

(58) Field of Classification Search
CPC . G06Q 20/405; G06F 16/2379; G06F 16/909; G06V 20/52; G06V 40/16; G01C 21/20; H04L 63/0876; H04L 63/08; H04L 63/107; H04L 2463/082; H04L 2463/102; H04L 2463/121
USPC .......................................................... 705/64
See application file for complete search history.

(56) References Cited

U.S. PATENT DOCUMENTS

| | | | |
|---|---|---|---|
| 10,282,720 B1* | 5/2019 | Buibas | G06V 20/52 |
| 10,282,852 B1* | 5/2019 | Buibas | G06T 7/246 |
| 10,333,982 B2* | 6/2019 | Hu | H04L 63/1408 |
| 10,825,028 B1* | 11/2020 | Kramme | G06Q 30/0185 |
| 2010/0059587 A1* | 3/2010 | Miller | G06Q 40/02 |
| | | | 235/379 |
| 2012/0033854 A1* | 2/2012 | Jo | G06T 7/246 |
| | | | 382/103 |
| 2013/0223696 A1 | 8/2013 | Azar et al. | |
| 2013/0290234 A1* | 10/2013 | Harris | G06Q 30/00 |
| | | | 901/50 |
| 2014/0279518 A1* | 9/2014 | Acuna-Rohter | G06Q 30/0185 |
| | | | 705/44 |
| 2015/0227934 A1* | 8/2015 | Chauhan | G06Q 20/3224 |
| | | | 705/44 |
| 2016/0261984 A1* | 9/2016 | Shrinath | H04W 4/021 |
| 2016/0292679 A1* | 10/2016 | Kolin | G06Q 20/40 |
| 2019/0057374 A1* | 2/2019 | Hernandez-Ellsworth | |
| | | | G06Q 20/3224 |
| 2019/0089701 A1* | 3/2019 | Mercury | G06F 30/20 |
| 2019/0236738 A1* | 8/2019 | Lebel | G06F 18/214 |
| 2021/0027309 A1* | 1/2021 | Wells | H04L 51/10 |
| 2021/0243595 A1* | 8/2021 | Buck | H04W 12/088 |
| 2021/0383392 A1* | 12/2021 | Edwards | G06V 20/52 |
| 2022/0122071 A1* | 4/2022 | Kramme | G06Q 20/20 |
| 2022/0343332 A1* | 10/2022 | Deng | G06Q 20/4016 |

* cited by examiner

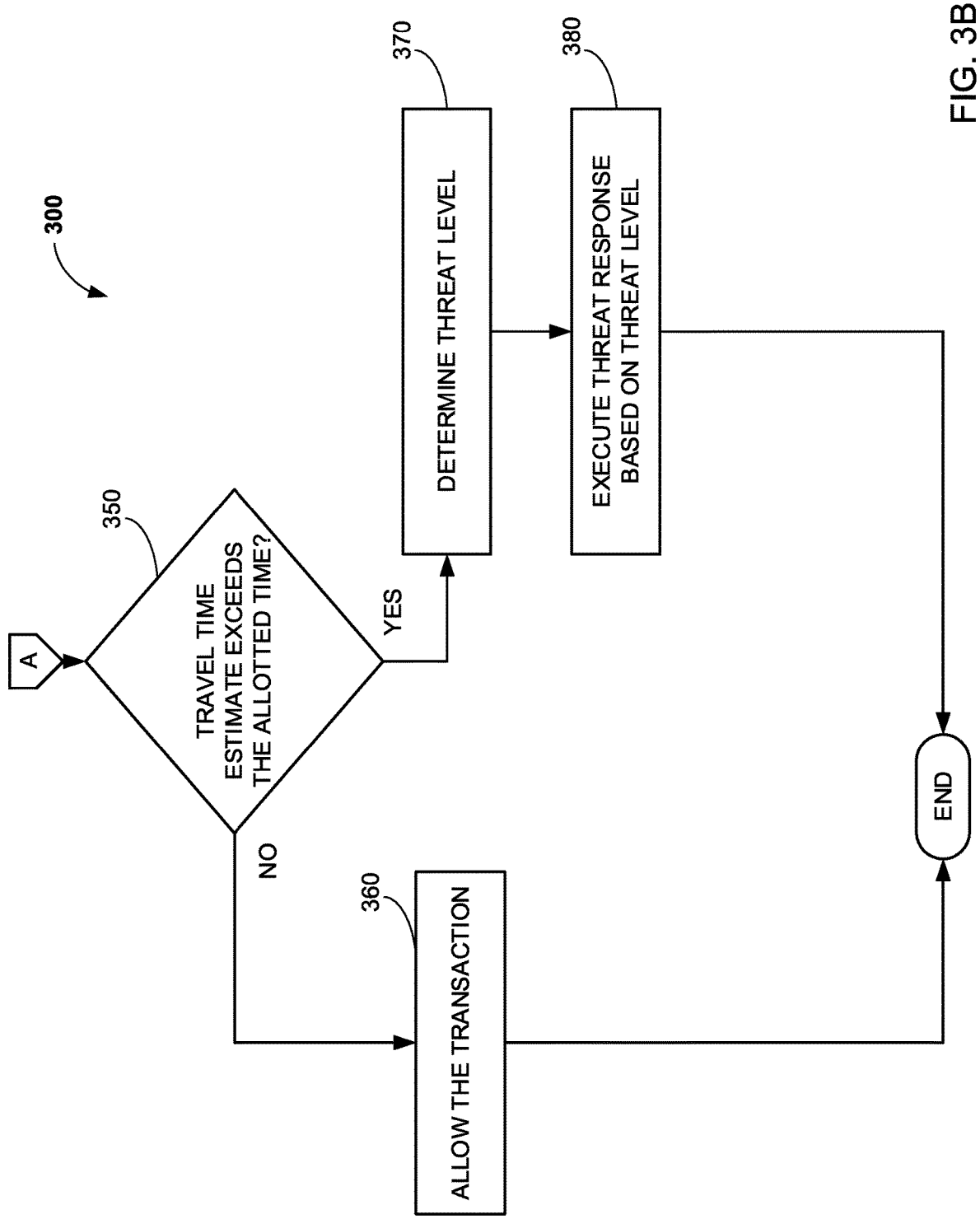

SYSTEMS AND METHODS FOR FRAUD DETECTION AND PREVENTION

FIELD OF INVENTION

Examples of the present disclosure relate to systems for fraud detection and prevention and, more particularly, to fraud mitigation using video-based monitoring techniques for determining potentially fraudulent transactions.

BACKGROUND

Fraud associated with purchases is a growing problem in the modern economy, harming innocent customers, suppliers, merchants, and financial service providers alike. Often, fraudulent activities are not immediately discovered, which may enable perpetrators to commit more fraudulent actions before suspicion arises. Many existing, fraud detection and preventions systems are based on a customer becoming aware of the identity theft based on noticing transactions that are incompatible with the customer's typical purchasing profile. However, such systems are limited because by the time a respective customer becomes aware of potentially fraudulent activity associated with his/her account, a perpetrator may have already successfully completed one or more fraudulent transactions.

Accordingly, there is a need for improved fraud detection and prevention systems and methods configured to use video-based detection systems in order to prevent a fraudulent transaction before it is authorized. Examples of the present disclosure are directed to this and to other considerations.

SUMMARY

Examples of the present disclosure comprise systems and methods for fraud detection and prevention.

Consistent with the disclosed embodiments, various methods and systems are disclosed. In an embodiment, a system for fraud detection and prevention is disclosed. The system may receive a transaction request associated with a first customer. The transaction request may be associated with a card present transaction, in which the first customer pays with a transaction card (e.g. a credit card), or in some embodiments, the transaction request may be associated with a card not present transaction, in which the first customer may not be present at the location of the merchant associated with the transaction (e.g. when the first customer makes an order with the respective merchant over the phone). As part of the transaction request, the system may receive a transaction location, a transaction time stamp, and a merchant type code. Upon receiving the transaction request, the system may run an initial check to determine whether the transaction request corresponds to an expected location for the first customer. This may involve comparing the transaction location to historical transaction data to determine whether the location is expected for the customer. When the location is expected, the system may determine that no fraud is likely and take no further action. When the location is unexpected, the system may use images received from image capture devices to identify the first customer in video or photo footage (e.g., security camera footage) including a last-known time stamp and a last-known location. The system may base the last-known location on the known location of a stationary image capture device. By comparing the transaction location and the last-known location, the system may determine a travel distance and use it to estimate a travel time. When the estimated travel time surpasses an allotted time, the system may execute one or more fraud prevention steps. To calculate the allotted time, the system may determine the difference between the two timestamps and further subtract estimated non-travel time (e.g., for eating at a restaurant) based on the merchant type code.

Further features of the disclosed design, and the advantages offered thereby, are explained in greater detail hereinafter with reference to specific examples illustrated in the accompanying drawings, wherein like elements are indicated be like reference designators.

BRIEF DESCRIPTION OF THE DRAWINGS

Reference will now be made to the accompanying drawings, which are not necessarily drawn to scale, are incorporated into, and constitute a portion of, this disclosure, illustrate various implementations and aspects of the disclosed technology and, together with the description, serve to explain the principles of the disclosed technology. In the drawings:

FIGS. 3A-3B are flowcharts of a method for detecting and preventing fraud by executing a fraud response based on a determined threat level, in accordance with some examples of the present disclosure;

DETAILED DESCRIPTION

Some implementations of the disclosed technology will be described more fully with reference to the accompanying drawings. This disclosed technology, however, may be embodied in many different forms and should not be construed as limited to the implementations set forth herein. The components described hereinafter as making up various elements of the disclosed technology are intended to be illustrative and not restrictive. Many suitable components that could perform the same or similar functions as components described herein are intended to be embraced within the scope of the disclosed systems and methods. Such other components not described herein may include, but are not limited to, for example, components developed after development of the disclosed technology. Wherever convenient, the same references numbers will be used throughout the drawings to refer to the same or like parts.

Figure 1:
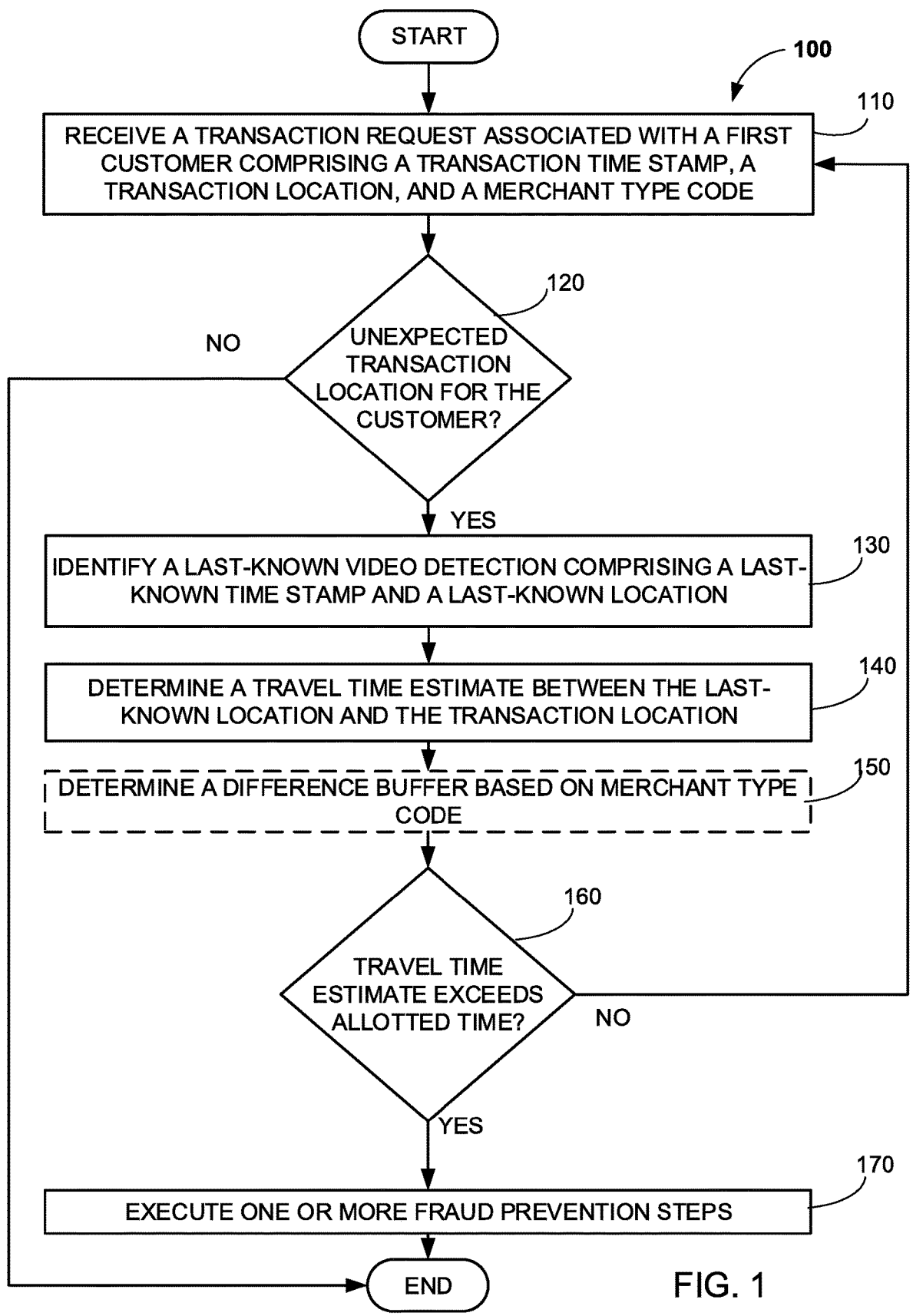
FIG. 1 is a flowchart of a method for detecting and preventing fraud for an unexpected transaction location for a respective customer, in accordance with some examples of the present disclosure.

FIG. 1 is a flowchart of a method for detecting and preventing fraud for an unexpected transaction location for a respective customer, in accordance with some examples of the present disclosure. Although steps in method 100 are described as being performed by a system (e.g., an authentication system 510 and/or one or more other components of a system 500, as described in more detail with respect to FIGS. 5-6), a person of ordinary skill in the art will understand that some or all of the steps of method 100 may be performed by a device (e.g., customer device 550, as described in more detail with respect to FIG. 5). As shown in FIG. 1, in step 110 of method 100, the system (e.g., authentication system 510) may receive a transaction request associated with a first customer. The transaction request may include a transaction time stamp, a transaction location, and a merchant type code. For example, customer A, wishing to make a purchase at merchant A, may use a transaction card provided by a financial service provider. The transaction request, if approved, would generate a transaction with an associated transaction time stamp based on information generated in response to the transaction being authenticated and approved by the financial service provider. In some embodiments, the transaction location may be based on GPS coordinates received from a customer device. In some embodiments, the transaction location may be based on an address associated with, e.g., merchant A. Associated with the transaction time stamp and transaction location may be a merchant type code for uniquely identifying merchant A. In some embodiments, the transaction location may be stored on one or more servers of financial service provider based on a respective merchant type code associated with, e.g., merchant A.

In decision block 120, the system (e.g., system 500 and/or authentication system 510) may determine whether the transaction location is an expected location for the first customer. For example, the system may compare the transaction location with previous transaction locations over a predetermined period, and determine, based on the historical transaction data, whether the first customer is in an expected location. The system may receive historical transaction data from a financial service provider associated with the first customer When the system determines that the transaction location is an expected location for the customer, it may conclude that there is a low risk of fraud and approve the transaction request. For example, the authentication system may determine, based on the historical transaction data from the financial service provider associated with the first customer, that the first customer has purchased an airline ticket. The authentication system may determine the airline provider and respective flight number of the flight and use available flight data from the airline provider to determine an expected location for a period of time associated with the destination of the flight. If the historical transaction data includes data indicative of a reservation of a hotel, vacation rental, or any other lodging, the authentication system may determine that the expected location is at the location of the reserved lodging for a duration of time equivalent to a reservation period associated with the previous transaction. The authentication system may also determine an expected location based on previous transactions such as The expected location may be based on a purchase of an airline ticket. The expected location may be based on a series of transactions occurring in a location outside of a known hometown for the first customer. For example, the system may determine that the first customer has conducted a series of transactions indicative of an expected location when the customer makes a purchase at a convenience store, orders a rideshare or a taxi service, and/or makes reservation at a hotel, as described above. After the transaction is allowed, method 100 may end. When the system determines that the transaction location is an unexpected location for the customer, the system may conclude that there is an elevated risk of fraud and perform fraud prevention step(s) by moving to step 130.

In step 130, the system (e.g., authentication system 510) may identify a last known video detection for the first customer. The last-known video detection may include a last-known time stamp and a last-known location. Returning back to our earlier example, customer A may have been detected by an image capture device (e.g., third party image capture device(s) 530, described in more detail with respect to FIG. 5) before making a transaction with merchant A. The image capture device may identify customer A using facial recognition techniques and using image data associated with customer A that is stored on one or more servers of the financial service provider and/or stored on the system (e.g. authentication system 510). In some embodiments, the system may receive image data associated with a respective customer from the financial service provider. In another example, a respective customer may opt to upload his or her government issued ID image. The system (e.g., authentication system 510) may use image-recognition techniques known in the art to analyze the uploaded image and use the uploaded image to help recognize the respective customer when he or she appears on a security camera, CCTV monitoring system, and the like. The authentication system may compare the analyzed image from the government issued ID to the captured video footage of the respective customer and use known image comparison algorithms to determine whether there is a match beyond a predetermined threshold.

In step 140, the system (e.g., authentication system 510) may determine a travel time estimate between the last-known location and the transaction location. In some embodiments, the transaction location may not correspond with a brick and mortar merchant location, because the customer may make a purchase over the phone in a card not present transaction. The system may assess whether the transaction request is associated with an in-store purchase or an online/remote purchase by analyzing the transaction request data to determine whether the transaction request is associated with a card present or card not present transaction. Additionally, the system may compare the transaction time to hours of operation for the respective merchant to infer whether the transaction is associated with an online purchase or a remote purchase. In some embodiments, a trained machine learning algorithm may be employed by the system in order to determine whether a transaction is a card present or card not present transaction by analyzing transaction data associated with the transaction request. For example, the trained machine learning algorithm may determine whether a transaction is a card present transaction by determining that the transaction location matches location data received from a customer device (e.g., customer device 550). In some embodiments, to determine the travel time estimate the system may determine a distance between the last-known location and the transaction location and compare the distance to a travel threshold (e.g., 100 miles). When the distance surpasses the travel threshold, the system may estimate a travel speed based on average flight speed data. When the distance does not surpass the travel threshold, the system may estimate the travel speed based on vehicle traffic data. For example, if the distance determined between the last-known location and the transaction location is, e.g., less than 100 miles, the system may estimate a travel speed based on the customer driving from the last-known location and the transaction location. The system may access publicly available traffic data generated by a third party and use the traffic data to estimate a travel time. Additionally, the system may index traffic patterns for locations matching a home region for the customer and/or an expected travel location for a respective customer. For example, if a hometown region associated with the respective customer is Richmond, VA, the system may keep indexed the average traffic patterns by time of day for the city of Richmond, and if previous transaction history indicates that the respective customer has made purchases indicating an expected location for Washington DC, the system may determine that the travel threshold indicates that the respective customer will use ground-based transportation (e.g., a car, taxi, bus), and use existing vehicle traffic data to estimate a travel time between Washington D.C. and Richmond, VA. A similar determination for expected travel time may be determined in response to the system determining that the respective customer will travel from Richmond to Washington by train. In this case, the system may access publicly available train travel time data from a third-party server to determine estimated travel time. If the distance determined between the last-known location and the transaction location is, e.g., more than 100 miles, the system may use flight data in order to estimate a travel time. For example, the system may access flight data from a third party and determine a travel time estimate based on flights available from an airport nearest to the last-known location to an airport nearest to the transaction location.

Optionally, in step 150, the system (e.g., authentication system 510) may determine a buffer to be subtracted from an allotted time (e.g., a maximum amount of time allotted for a respective customer to travel from a last known location to the transaction location) based on the merchant type code. For example, when the merchant type code indicates that the merchant is a restaurant, the buffer may be determined based on third party data indicating how long an average consumer spent at the respective restaurant. If the restaurant were a fast food restaurant, the determined buffer may only be, e.g., 20 minutes (i.e., an average time for eating at the respective fast food restaurant). If the restaurant were a fine dining establishment, the system may determine the buffer to be, e.g., 90 minutes, indicating that an average consumer at the respective fine dining restaurant would spend, on average, about 90 minutes eating. The buffer may be subtracted from the time difference between the last-known time stamp and the transaction time stamp. This is because the system accounts for a time period during which the customer is not traveling when comparing the travel time estimate to the actual travel time as determined by calculating the difference between the last-known time stamp and the transaction time stamp. To ensure that travel time estimate is comparable to the actual travel time, time associated with other activities (i.e., the buffer) may be subtracted out from the actual travel time to determine an allotted time. Other factors that may factor into the buffer include the time of day (e.g., lunch rush hour may be associated with a higher buffer) and a respective merchant's popularity as compared with other merchants of a similar category in a respective region (e.g., a more popular merchant as determined by an average number of customers per unit of time may indicate to the system to adjust the buffer higher).

In decision block 160, the system (e.g., authentication system 510) may compare the travel time estimate to the allotted time, which is determined by subtracting the buffer from the actual travel time, to determine whether the travel time estimate exceeds the allotted time. The allotted time may be equal to the difference between the transaction time stamp and the last-known time stamp, less the buffer. This is so that the time period in which the customer is not traveling (e.g. eating at a restaurant) is not included in the travel time comparison step 160. When the travel time estimate exceeds the allotted time, the method may move to step 170. When the travel time estimate does not exceed the allotted time, the method may return to step 110 to receive a transaction request. When optional step 150 is not performed, the system (e.g. authentication system 510) may compare the travel time estimate to an allotted time equal to the difference between the transaction time stamp and the last-known time stamp, with no correction made for the buffer.

In step 170, responsive to the travel time exceeding the allotted time, the system (e.g., authentication system 510) may execute one or more fraud prevention steps. Returning back to the fast food restaurant example, the system may have determined that the travel time estimate for a customer going from, e.g., Richmond, Virginia to Washington D.C. is two hours. The system may determine, based on the merchant category code, that the customer has made a transaction with Fast Food Merchant A. The system may additionally determine that a difference between the transaction time stamp and the last-known time stamp is also two hours (e.g., when the transaction time stamp is for 4 pm and the last-known location time stamp was at 2 pm the same day). In order to compare the travel time estimate to actual travel time, the system determines that the average time spent in Fast Food Merchant A is 20 minutes based on available third-party data. Accordingly, the system compares the estimated travel time of 2 hours with the time difference between the time stamps (i.e., 2 hours) less the time not associated with travel (i.e., 20 minutes). Thus, the system may determine that the estimated travel time of 2 hours exceeds the allotted time of 1 hour and 40 minutes. When the estimated travel time exceeds the allotted time, the system may execute one or more fraud prevention steps. The one or more fraud prevention steps may include, for example, denying the transaction, and/or monitoring a predetermined number of subsequent transaction requests for the first customer for potentially fraudulent activities. The system may set the predetermined number of subsequent transactions to monitor based on a magnitude by which the travel time exceeds the allotted time, such that a greater predetermined number of subsequent transactions may be monitored for potentially fraudulent activities when the travel time exceeds the allotted time by a greater value. After step 170, method 100 may end.

Figure 2:
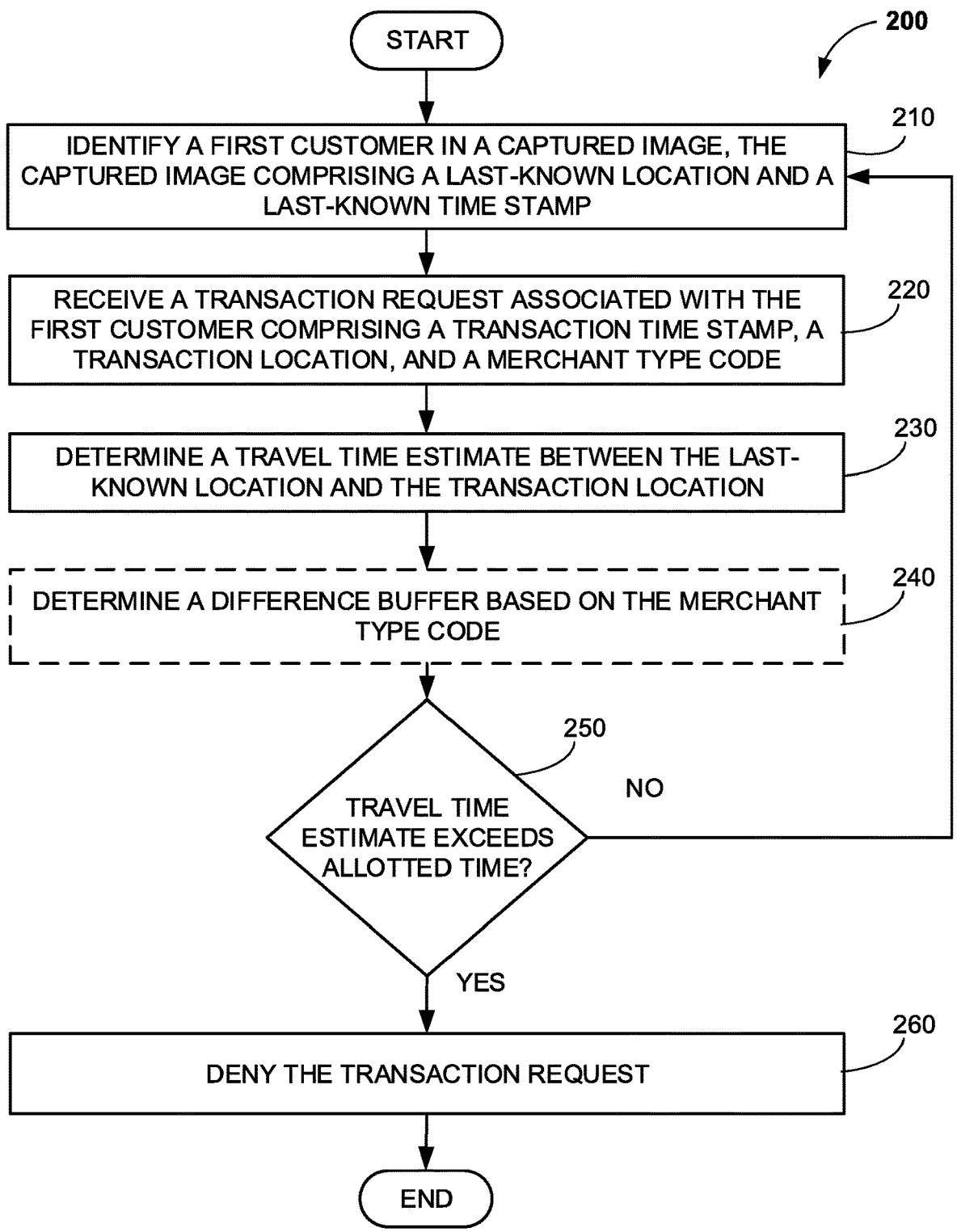
FIG. 2 is a flowchart of a method for detecting and preventing fraud, in accordance with some examples of the present disclosure.

FIG. 2 is a flowchart of a method for detecting and preventing fraud, in accordance with some examples of the present disclosure. Although steps in method 200 are described as being performed by the system (e.g., authentication system 510 and/or one or more other components of a system 500), a person of ordinary skill in the art will understand that some or all of the steps of method 200 may be performed by the device (e.g., customer device 550). As shown in FIG. 2, in step 210 of method 200, the system (e.g., authentication system 510) may identify a first customer in a captured image. The captured image may be captured by a third-party camera (e.g., by third party image capture device(s) 530) or, in some embodiments, the system may utilize its own image capture devices to capture the image (e.g. image capture device(s) 540). Regardless, the system may be capable of identifying a first customer in the captured image. The first customer may be identified by using facial recognition methods. The image capture device may identify customer A using facial recognition techniques and using image data associated with customer A that is stored on one or more servers of the financial service provider (e.g., financial service provider 560) and/or stored on the system (e.g. authentication system 510). In some embodiments, the system may receive image data associated with a respective customer from a financial service provider. In some embodiments, the image data received by the system may be based on an uploaded image of a government associated ID associated with a respective customer. In another example, the system may receive image data from one or more uploaded photos or video supplied by the respective customer to the system. In another example, the system may receive image data from one or more third parties, for example, from a social network account associated with the respective customer. The customer may give the system access to the social network account, and accordingly the system may analyze one or more videos and/or photos to determine image data for the respective customer.

In step 220, the system may receive a transaction request associated with a first customer. The transaction request may include a transaction time stamp, a transaction location, and a merchant type code. For example, customer A, wishing to make a purchase at merchant A, may use a transaction card provided by a financial service provider. The transaction request, if approved, would generate a transaction with an associated transaction time stamp based on information generated in response to the transaction being authenticated and approved by the financial service provider. In some embodiments the transaction location may be based on GPS coordinates received from a customer device. In some embodiments, the transaction location may be based on an address associated with, e.g., merchant A. Associated with the transaction time stamp and transaction location may be a merchant type code for uniquely identifying merchant A. In some embodiments, the transaction location may be stored on one or more servers of financial service provider based on a respective merchant type code associated with, e.g., merchant A.

In step 230, the system (e.g., authentication system 510) may determine a travel time estimate between the last-known location and the transaction location. In some embodiments, to determine the travel time estimate the system may determine a distance between the last-known location and the transaction location and compare the distance to a travel threshold (e.g., 100 miles). When the distance surpasses the travel threshold, the system may estimate a travel speed based on average flight speed data. When the distance does not surpass the travel threshold, the system may estimate the travel speed based on vehicle traffic data. For example, if the distance determined between the last-known location and the transaction location is, e.g., less than 100 miles, the system may estimate a travel speed based on the customer driving from the last-known location and the transaction location. The system may access publicly available traffic data generated by a third party and use the traffic data to estimate a travel time. If the distance determined between the last-known location and the transaction location is, e.g., more than 100 miles, the system may use flight data in order to estimate a travel time. For example, the system may access flight data from a third party and determine a travel time estimate based on flights available from an airport nearest to the last-known location to an airport nearest to the transaction location.

Optionally, in step 240, the system (e.g., authentication system 510) may determine a buffer to be subtracted from an allotted time (e.g., a maximum amount of time allotted for a respective customer to travel from a last known location to the transaction location) based on the merchant type code. For example, when the merchant type code indicates that the merchant is a restaurant, the buffer may be determined based on third party data indicating how long an average consumer spent at the respective restaurant. If the restaurant were a fast food restaurant, the determined buffer may only be, e.g., 20 minutes (i.e., an average time for eating at the respective fast food restaurant). If the restaurant were a fine dining establishment, the system may determine the buffer to be, e.g., 90 minutes, indicating that an average consumer at the respective fine dining restaurant would spend, on average, about 90 minutes eating. The buffer may be subtracted from the time difference between the last-known time stamp and the transaction time stamp. This is because the system accounts for a time period during which the customer is not traveling when comparing the travel time estimate to the actual travel time as determined by calculating the difference between the last-known time stamp and the transaction time stamp. To ensure that estimated travel time is compared to actual travel time, time associated with other activities (i.e., the buffer) may be subtracted out from the actual travel time.

In decision block 250, the system (e.g., authentication system 510) may compare the travel time estimate to an allotted time, factoring in the buffer to determine whether the travel time estimate exceeds the allotted time. The allotted time may be equal to the difference between the transaction time stamp and the last-known time stamp, less the buffer. This is so that the time period in which the customer is not traveling (e.g. eating at a restaurant) is not included in the travel time comparison step 250. When the travel time estimate exceeds the allotted time, the method may move to step 260. When the travel time estimate does not exceed the allotted time, the method may return to step 210 to identify a first customer in a captured image. When optional step 240 is not performed, the system (e.g., authentication system 510) may compare the travel time estimate to an allotted time equal to the difference between the transaction time stamp and the last-known time stamp, with no correction made for the buffer.

In step 260, responsive to the travel time exceeding the allotted time, the system (e.g., authentication system 510) may deny the transaction request. Returning back to the fast food restaurant example, the system may have determined that the travel time estimate for a customer going from, e.g., Richmond, Virginia to Washington D.C. is two hours. The system may determine, based on the merchant category code, that the customer has made a transaction with Fast Food Merchant A. The system may additionally determine that a difference between the transaction time stamp and the last-known time stamp is also two hours (e.g., when the transaction time stamp is for 4 pm and the last-known location time stamp was at 2 pm the same day). In order to compare travel-time estimate to actual travel time, the system determines that the average time spent in Fast Food Merchant A is 20 minutes based on available third-party data. Accordingly, the system compares the estimated travel time of 2 hours with the time difference between the time stamps (i.e., 2 hours) less the time not associated with travel (i.e., 20 minutes). Thus, the system may determine that the estimated travel time of 2 hours exceeds the allotted time of 1 hour and 40 minutes. When the estimated travel time exceeds the allotted time, the system may deny the transaction. In addition to denying the transaction, the system may, in some embodiments, monitor a predetermined number of subsequent transaction requests for the first customer for potentially fraudulent activities. The system may set the predetermined number of subsequent transactions to monitor based on a magnitude by which the travel time exceeds the allotted time, such that a greater predetermined number of subsequent transactions may be monitored for potentially fraudulent activities when the travel time exceeds the allotted time by a greater value. The system may additionally set the number of subsequent transactions to be monitored based in part on a number of past detected fraudulent events. For example, if a respective customer has never had a detected fraudulent event, the number of subsequent transactions that will be monitored may be adjusted downwards. If the respective customer has had at least one detected fraudulent event in his/her transaction history, the system may monitor more subsequent transactions for fraud. The number of subsequent transactions may also be adjusted based on the frequency of detected fraudulent activity in the respective customer's transaction history, and based on how recently the fraudulent activity has occurred. After step 260, method 200 may end.

Figure 3A:
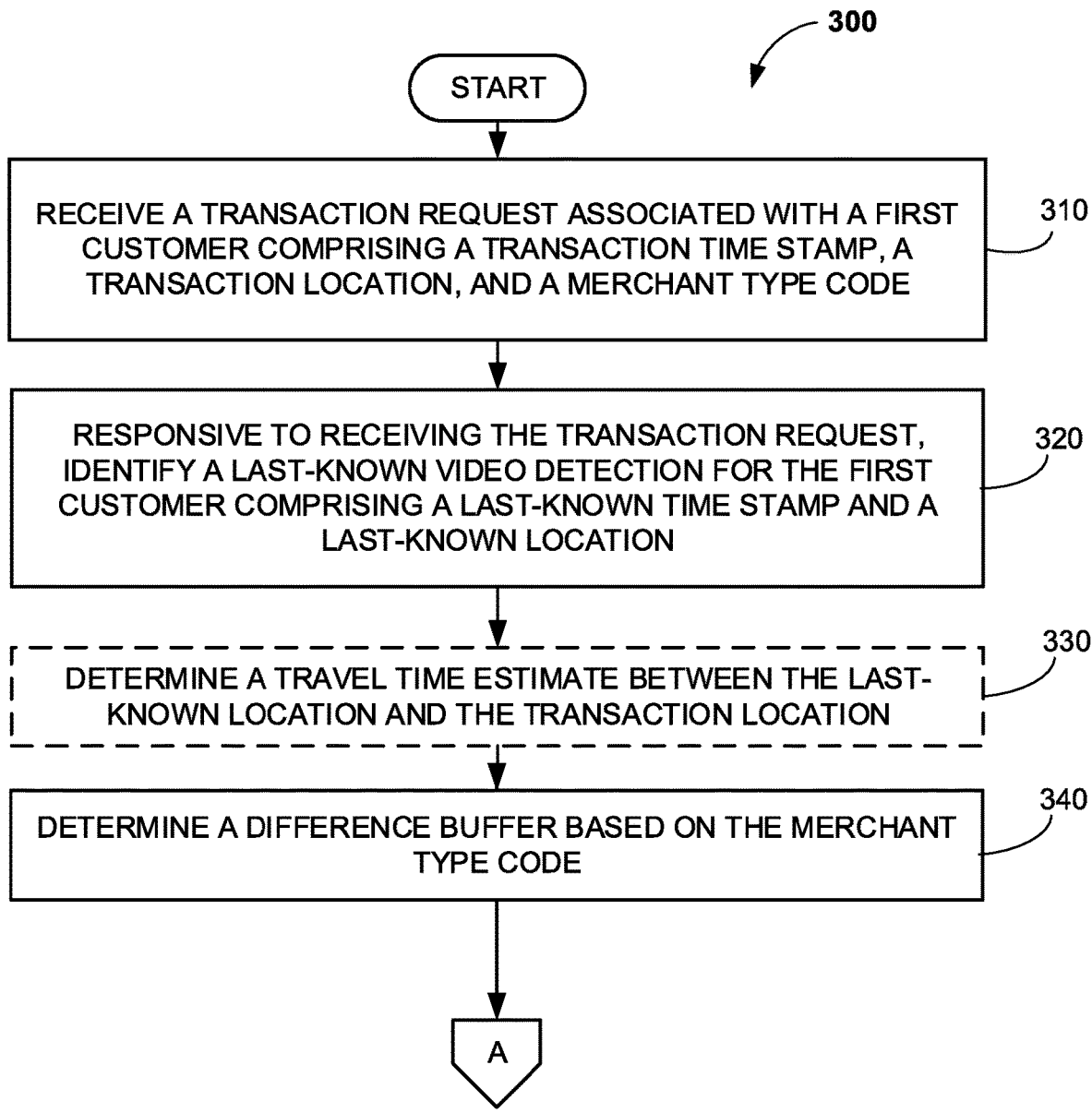

FIG. 3A-3B are flowcharts of a method for detecting and preventing fraud by executing a fraud response based on a determined threat level, in accordance with some examples of the present disclosure. Although steps in method 300 are described as being performed by the system (e.g., authentication system 510 and/or one or more other components of system 500), a person of ordinary skill in the art will understand that some or all of the steps of method 300 may be performed by the device (e.g., customer device 550). As shown in FIG. 3A, in step 310 of method 300, the system (e.g., authentication system 510) may receive a transaction request associated with a first customer. The transaction request may include a transaction time stamp, a transaction location, and a merchant type code. For example, customer A, wishing to make a purchase at merchant A, may use a transaction card provided by a financial service provider. The transaction request, if approved, would generate a transaction with an associated transaction time stamp based on information generated in response to the transaction being authenticated and approved by the financial service provider. In some embodiments the transaction location may be based on GPS coordinates received from a customer device. In some embodiments, the transaction location may be based on an address associated with, e.g., merchant A. Associated with the transaction time stamp and transaction location may be a merchant type code for uniquely identifying merchant A. In some embodiments, the transaction location may be stored on one or more servers of financial service provider based on a respective merchant type code associated with, e.g., merchant A.

In step 320, the system (e.g., authentication system 510) may identify a last known video detection for the first customer. The last-known video detection may include a last-known time stamp and a last-known location. Returning back to our earlier example, customer A may have been detected by an image capture device (e.g., third party image capture device(s) 530, described in more detail with respect to FIG. 5) before making a transaction with merchant A. The image capture device may identify customer A using facial recognition techniques and using image data associated with customer A that is stored on one or more servers of the financial service provider and/or stored on the system (e.g. authentication system 510). In some embodiments, the system may receive image data associated with a respective customer from the financial service provider.

In step 330, the system (e.g., authentication system 510) may determine a travel time estimate between the last-known location and the transaction location. In some embodiments, to determine the travel time estimate the system may determine a distance between the last-known location and the transaction location and compare the distance to a travel threshold (e.g., 100 miles). When the distance surpasses the travel threshold, the system may estimate a travel speed based on average flight speed data. When the distance does not surpass the travel threshold, the system may estimate the travel speed based on vehicle traffic data. For example, if the distance determined between the last-known location and the transaction location is, e.g., less than 100 miles, the system may estimate a travel speed based on the customer driving from the last-known location and the transaction location. The system may access publicly available traffic data generated by a third party and use the traffic data to estimate a travel time. If the distance determined between the last-known location and the transaction location is, e.g., more than 100 miles, the system may use flight data in order to estimate a travel time. For example, the system may access flight data from a third party and determine a travel time estimate based on flights available from an airport nearest to the last-known location to an airport nearest to the transaction location. In some embodiments, the system (e.g., authentication system 510) may analyze customer transaction data (e.g., associated with financial service provider 560) to determine whether the customer has purchased airline tickets corresponding to the transaction location. In response to determining that relevant airline tickets have been purchased by the customer, the system may estimate the travel time based on flight data for associated with the purchased airline ticket.

Figure 4:
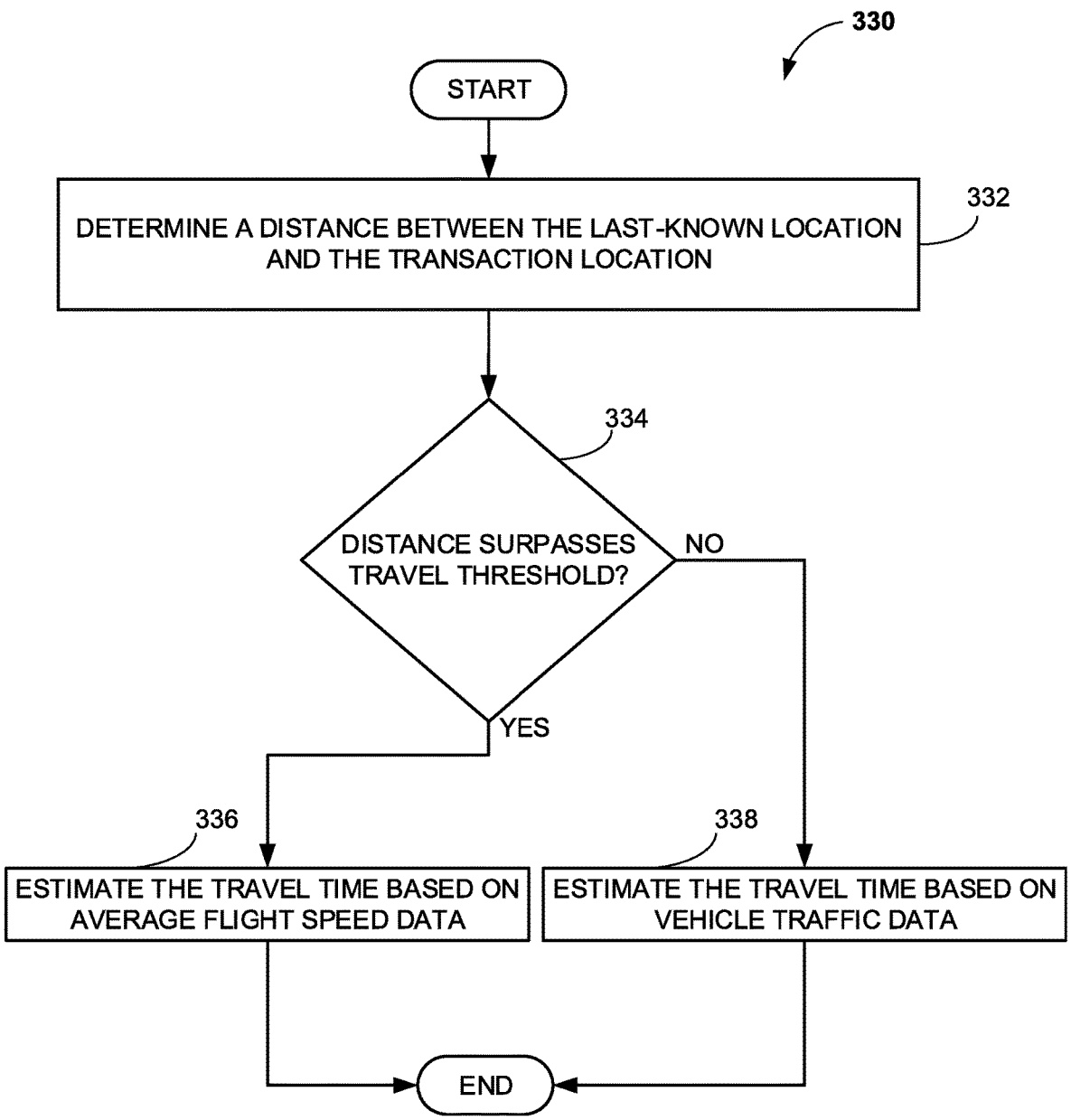
FIG. 4 is a flowchart of a method for estimating a travel time, in accordance with some examples of the present disclosure.

Step 330 is described in more detail with respect to FIG. 4. FIG. 4 is a flowchart of a method for estimating a travel time, in accordance with some examples of the present disclosure. FIG. 4 provides additional detail regarding how the system determines a travel time estimate between the last-known location and the transaction location as described in step 330 of method 300. In step 332 of method 330, the system may determine a distance between the last-known location and the transaction location. For example, this may be accomplished by finding a straight line "as the crow flies" distance between the last-known location (the location known to the system based on a location of the stationary image capture device that detected the customer) and the transaction location. The transaction location may be determined based on the merchant category code. In some embodiments, the travel distance may be determined based on a driving distance following a "shortest travel time" routing algorithm. In other embodiments, the distance may be determined based on a driving distance following a "shortest distance traveled" routing algorithm. In yet other embodiments, the travel distance may be estimated based on air-travel distance between an airport nearest to the last-known location to an airport nearest to the transaction location combined with an estimated driving distance to and from each respective airport.

In decision block 334, the system may compare the distance to a travel threshold. The travel threshold represents a maximum distance that a respective customer would be willing to drive to a location. Beyond the travel threshold, it is assumed that a respective customer would not be willing to drive, but would seek alternative transportation methods (e.g., a flight aboard a commercial airline). The travel threshold may also be based in part on the travel activity of customers within a respective region. For example, most customers within New York city may prefer to travel by bus for distances less than 5 miles, by subway for distances more than 5 miles but less than 10 miles, and by taxi for distances more than 10 miles. The travel threshold can also be based in part on commuting data associated with a specific customer. For example, if a senator commutes from Delaware to Washington D.C. every day by train, the system will use this information in determining a travel threshold for the senator. The system may determine whether the distance surpasses the travel threshold. In response to the distance surpassing the travel threshold, the method may move to step 336. In response to the distance not surpassing the travel threshold, the method may move to step 338.

In step 337, in response to the distance surpassing the travel threshold, the system may estimate the travel time based on average flight speed data. If the distance determined between the last-known location and the transaction location is, e.g., more than 100 miles, the system may use flight data in order to estimate a travel time. For example, the system may access flight data from a third party and determine a travel time estimate based on flights available from an airport nearest to the last-known location to an airport nearest to the transaction location. In some embodiments, the travel time may be estimated based on air-travel distance between an airport nearest to the last-known location to an airport nearest to the transaction location combined with an estimated driving time to and from each respective airport. Following step 337, method 330 may end.

In step 338, in response to the distance not surpassing the travel threshold, the system may estimate the travel time based on vehicle traffic data. For example, if the distance determined between the last-known location and the transaction location is, e.g., less than 100 miles, the system may estimate a travel speed based on the customer driving from the last-known location and the transaction location. The system may access publicly available traffic data generated by a third party and use the traffic data to estimate a travel time. Following step 338, method 330 may end.

In step 340, the system (e.g., authentication system 510) may determine a buffer to be subtracted from an allotted time (e.g., a maximum amount of time allotted for a respective customer to travel from a last known location to the transaction location) based on the merchant type code. For example, when the merchant type code indicates that the merchant is a restaurant, the buffer may be determined based on third party data indicating how long an average consumer spent at the respective restaurant. If the restaurant were a fast food restaurant, the determined buffer may only be, e.g., 20 minutes (i.e., an average time for eating at the respective fast food restaurant). If the restaurant were a fine dining establishment, the system may determine the buffer to be, e.g., 90 minutes, indicating that an average consumer at the respective fine dining restaurant would spend, on average, about 90 minutes eating. The buffer may be subtracted from the time difference between the last-known time stamp and the transaction time stamp. This is because the system accounts for a time period during which the customer is not traveling when comparing the travel time estimate to the actual travel time as determined by calculating the difference between the last-known time stamp and the transaction time stamp. To ensure that estimated travel time is compared to actual travel time, time associated with other activities (i.e., the buffer) may be subtracted out from the actual travel time.

As shown in FIG. 3B, in decision block 350, the system (e.g. authentication system 510) may compare the travel time estimate to an allotted time, factoring in the buffer to determine whether the travel time estimate exceeds the allotted time. The allotted time may be equal to the difference between the transaction time stamp and the last-known time stamp, less the buffer. This is so that the time period in which the customer is not traveling (e.g. eating at a restaurant) is not included in the travel time comparison step 350 When the system determines that the travel time estimate does not exceed the allotted time, then method 300 may move to step 360. When the system determines that the travel time estimate exceeds the allotted time, the method 300 may move to step 370.

In response to the system (e.g. authentication system 510) determining that the travel time estimate does not exceed the allotted time, the system may allow the transaction in step 360. Returning back to the fast food restaurant example, the system may have determined that the travel time estimate for a customer going from, e.g., Richmond, Virginia to Washington D.C. is two hours. The system may determine, based on the merchant category code, that the customer has made a transaction with Fast Food Merchant A. The system may additionally determine that a difference between the transaction time stamp and the last-known time stamp is three hours (e.g., when the transaction time stamp is for 5 pm and the last-known location time stamp was at 2 pm the same day). In order to compare the travel time estimate to actual travel time, the system determines that the average time spent in Fast Food Merchant A is 20 minutes based on available third-party data. Accordingly, the system compares the estimated travel time of 2 hours with the time difference between the time stamps (i.e., 3 hours) less the time not associated with travel (i.e., 20 minutes). Thus, the system may determine that the estimated travel time of 2 hours does not exceed the allotted time of 2 hours and 40 minutes. When the estimated travel time does not exceed the allotted time, the system may allow the transaction.

In response to the system determining that the travel time estimate exceeds the allotted time, the system may move to step 370. In step 370, the system (e.g., authentication system 510) may determine a threat level. For example, when the travel time estimate exceeds the allotted time by at least a first threshold, the system may determine a high threat level. When the travel time estimate exceeds the allotted time by at least a (lower) second threshold, the system may determine a medium threat level. When the travel time estimate exceeds the allotted time by less than the second threshold, the system may determine a low threat level. Changing the facts of the above fast food example, suppose that the customer instead has made a transaction with Fine Dining Merchant A. The system may have determined that the travel time estimate for a customer going from, e.g., Richmond, Virginia to Washington D.C. is two hours. The system may determine, based on the merchant category code, that the customer has made a transaction with Fine Dining Merchant A. The system may additionally determine that a difference between the transaction time stamp and the last-known time stamp is three hours (e.g., when the transaction time stamp is for 5 pm and the last-known location time stamp was at 2 pm the same day). In order to compare the travel time estimate to actual travel time, the system determines that the average time spent in Fine Dining Merchant A is 90 minutes based on available third-party data. Accordingly, the system compares the estimated travel time of 2 hours with the time difference between the time stamps (i.e., 3 hours) less the time not associated with travel (i.e., 90 minutes). Thus, the system may determine that the estimated travel time of 2 hours exceeds the allotted time of 1 hour and 30 minutes.

In step 380, the system may execute a high threat response when the travel time estimate exceeds the allotted time by at least a first threshold. Returning to our fine dining example, the system may execute a high threat response when the travel time estimate (e.g., 2 hours) exceeds the allotted time (e.g., 1 hour and 30 minutes) by at least a first threshold (e.g., 30 minutes). Executing a high threat response may include denying the transaction and monitoring for fraud a first predetermined number of subsequent transaction requests associated with the first customer. The system may execute a medium threat response when the travel time estimate exceeds the allotted time by at least a second threshold. Returning to the fine dining example above, if the allotted time were, e.g., 1 hour and 45 minutes instead of 1 hour and 30 minutes because the time not associated with travel was only 75 minutes according to third party data, then the system may execute a medium threat response when the travel time estimate (e.g., 2 hours) exceeds the allotted time (e.g., 1 hour and 45 minutes) by at least a second threshold (e.g., 15 minutes). Executing a medium threat response may include requesting secondary authentication from a customer device associated with the first customer and monitoring for fraud a second predetermined number of subsequent transaction requests associated with the first customer. The second predetermined number of subsequent transaction requests may be a smaller number than the first predetermined number associated with the high threat response. The system may execute a low threat response when the travel time estimate exceeds the allotted time by less than the second threshold. Returning to the fine dining example above, if the allotted time were, e.g., 1 hour and 50 minutes instead of 1 hour and 45 minutes because the time not associated with travel was only 70 minutes according to third party data, then the system may execute a low threat response when the travel time estimate (e.g., 2 hours) exceeds the allotted time (e.g., 1 hour and 50 minutes) by less than the second threshold (e.g., 15 minutes). Executing a low threat response may include monitoring a third predetermined number of subsequent transaction requests for the first customer. The third predetermined number of subsequent transaction requests may be a smaller number than the second predetermined number associated with the medium threat response. After step 380, method 300 may end.

Figure 5:
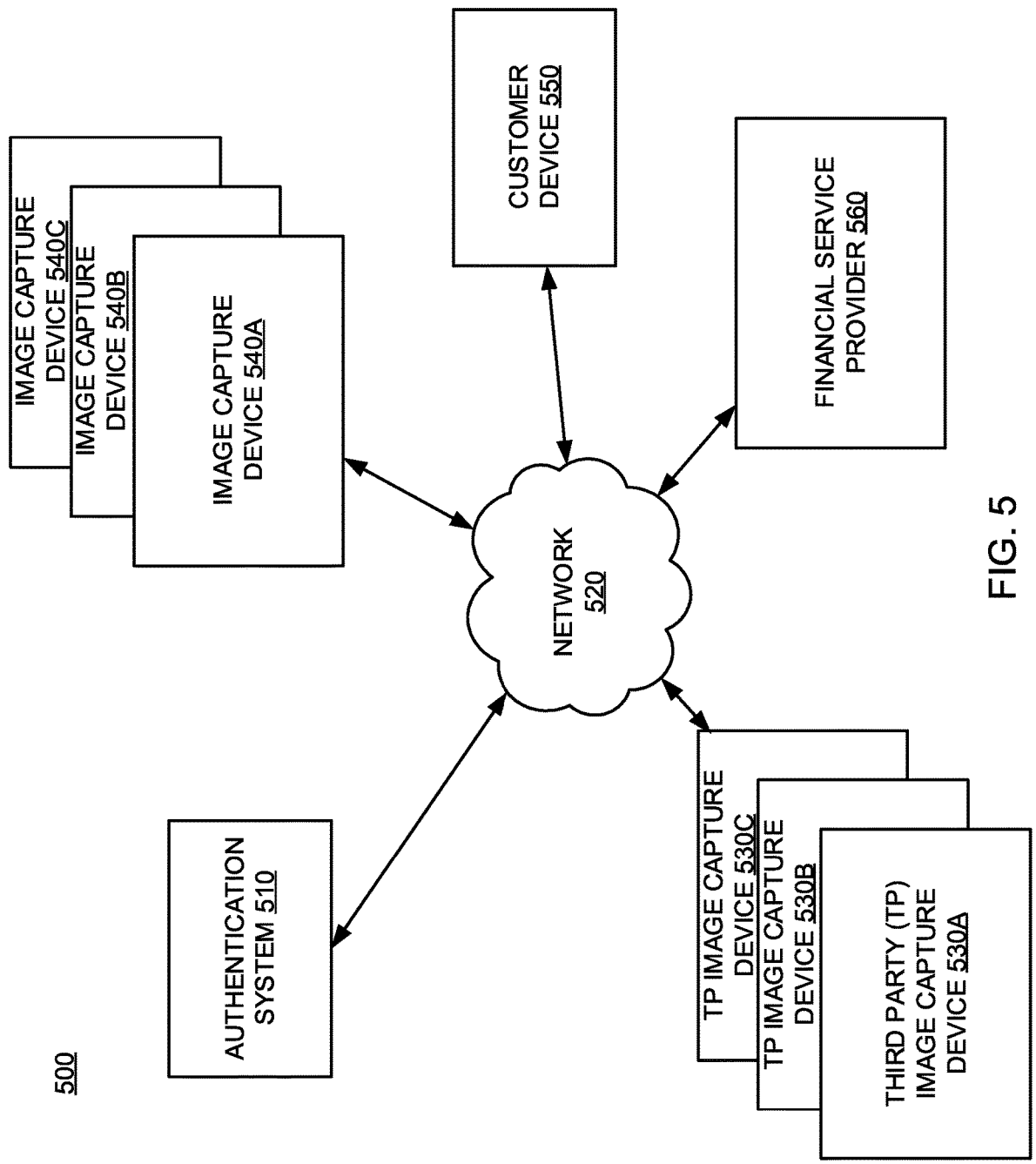
FIG. 5 is a system diagram of an exemplary fraud detection and prevention system consistent with disclosed embodiments.

FIG. 5 is a system diagram of an exemplary fraud detection and prevention system consistent with disclosed embodiments. The example system environment of FIG. 5 may be used to implement one or more embodiments of the present disclosure. The components and arrangements shown in FIG. 5 are not intended to limit the disclosed embodiments as the components used to implement the disclosed processes and features may vary.

In accordance with the disclosed embodiments, system 500 may include authentication system 510 in communication with one or more third party image capture devices 530A, 530B, 530C, etc. (collectively third-party image capture devices 530) and one or more image capture devices 540A, 540B, 540C, etc. (collectively image capture devices 540). The authentication system 510 may use a network 520 to communicate with the various other components of system 500, such as a customer device 550. In some embodiments, authentication system 510 may also be in communication with various financial service providers. For example, authentication system 510 may be in communication with a financial service provider 560. The financial service provider may store customer transaction data (e.g., a transaction request) that the system (e.g., via authentication system 510 and/or customer device 550) may download for storage and further analysis according to exemplary embodiments discussed herein. Customer device 550 may be a mobile computing devices (e.g., a smart phone, tablet computer, smart wearable device, portable laptop computer, voice command device, wearable augmented reality device, or other mobile computing device).

Network 520 may be of any suitable type, including individual connections via the internet such as cellular or WiFi networks. In some embodiments, network 520 may connect terminals using direct connections such as radio-frequency identification (RFID), near-field communication (NFC), Bluetooth™, low-energy Bluetooth™ (BLE), WiFi™, ZigBee™ ambient backscatter communications (ABC) protocols, USB, or LAN. Because the information transmitted may be personal or confidential, security concerns may dictate one or more of these types of connections be encrypted or otherwise secured. In some embodiments, however, the information being transmitted may be less personal, and therefore the network connections may be selected for convenience over security.

Figure 6:
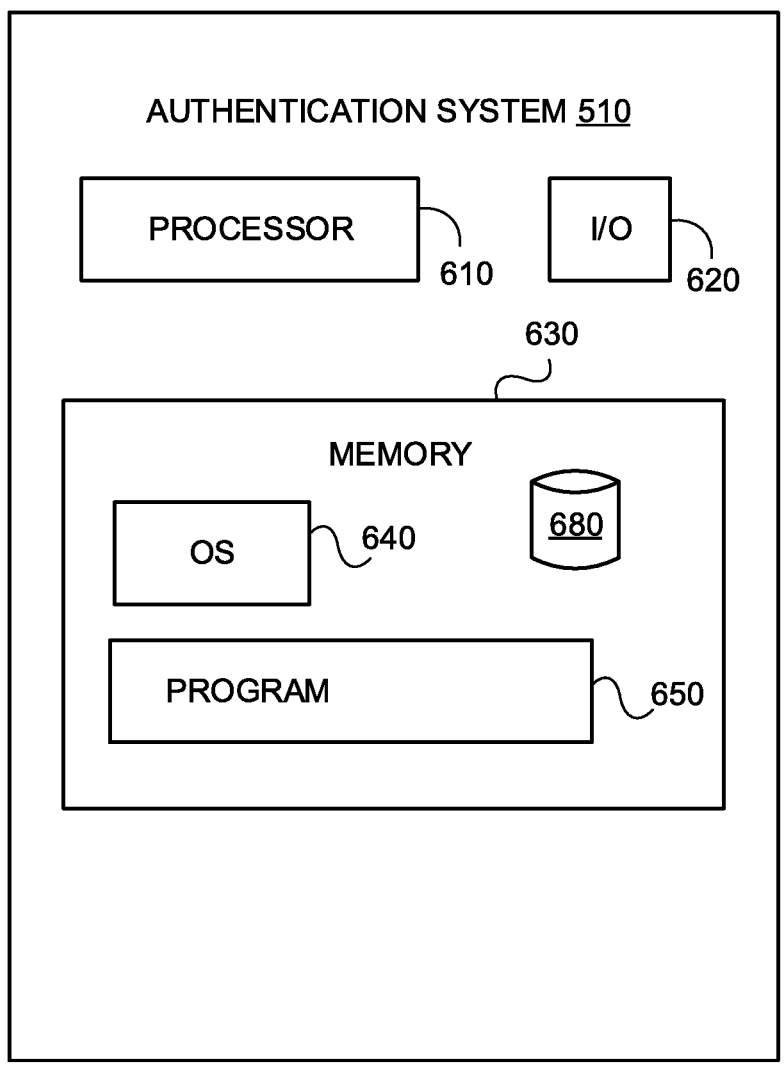
FIG. 6 is a component diagram of an exemplary fraud detection and prevention system.

An example embodiment of authentication system 510 is shown in more detail in FIG. 6. Customer device 550 may have a similar structure and components that are similar to those described with respect to authentication system 510. As shown, authentication system 510 may include a processor 610, an input/output ("I/O") device 620, a memory 630 containing an operating system ("OS") 640, a program 650, and a database 680. For example, authentication system 510 may be a single server or may be configured as a distributed computer system including multiple servers or computers that interoperate to perform one or more of the processes and functionalities associated with the disclosed embodiments. In some embodiments, predatory loan preemption system 510 may further include a peripheral interface, a transceiver, a mobile network interface in communication with processor 610, a bus configured to facilitate communication between the various components of the authentication system 510, and a power source configured to power one or more components of authentication system 510.

A peripheral interface may include the hardware, firmware and/or software that enables communication with various peripheral devices, such as media drives (e.g., magnetic disk, solid state, or optical disk drives), other processing devices, or any other input source used in connection with the instant techniques. In some embodiments, a peripheral interface may include a serial port, a parallel port, a general-purpose input and output (GPIO) port, a game port, a universal serial bus (USB), a micro-USB port, a high definition multimedia (HDMI) port, a video port, an audio port, a Bluetooth™ port, a near-field communication (NFC) port, another like communication interface, or any combination thereof.

In some embodiments, a transceiver may be configured to communicate with compatible devices and ID tags when they are within a predetermined range. A transceiver may be compatible with one or more of: radio-frequency identification (RFID), near-field communication (NFC), Bluetooth™, low-energy Bluetooth™ (BLE), WiFi™, ZigBee™ ambient backscatter communications (ABC) protocols or similar technologies.

A mobile network interface may provide access to a cellular network, the Internet, or another wide-area network. In some embodiments, a mobile network interface may include hardware, firmware, and/or software that allows processor(s) 610 to communicate with other devices via wired or wireless networks, whether local or wide area, private or public, as known in the art. A power source may be configured to provide an appropriate alternating current (AC) or direct current (DC) to power components.

Processor 610 may include one or more of a microprocessor, microcontroller, digital signal processor, co-processor or the like or combinations thereof capable of executing stored instructions and operating upon stored data. Memory 630 may include, in some implementations, one or more suitable types of memory (e.g. such as volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like), for storing files including an operating system, application programs (including, for example, a web browser application, a widget or gadget engine, and or other applications, as necessary), executable instructions and data. In one embodiment, the processing techniques described herein are implemented as a combination of executable instructions and data within the memory 630.

Processor 610 may be one or more known processing devices, such as a microprocessor from the Pentium™ family manufactured by Intel™ or the Turion™ family manufactured by AMD™. Processor 610 may constitute a single core or multiple core processor that executes parallel processes simultaneously. For example, processor 610 may be a single core processor that is configured with virtual processing technologies. In certain embodiments, processor 610 may use logical processors to simultaneously execute and control multiple processes. Processor 610 may implement virtual machine technologies, or other similar known technologies to provide the ability to execute, control, run, manipulate, store, etc. multiple software processes, applications, programs, etc. One of ordinary skill in the art would understand that other types of processor arrangements could be implemented that provide for the capabilities disclosed herein.

Authentication system 510 may include one or more storage devices configured to store information used by processor 610 (or other components) to perform certain functions related to the disclosed embodiments. In one example, authentication system 510 may include memory 630 that includes instructions to enable processor 610 to execute one or more applications, such as server applications, network communication processes, and any other type of application or software known to be available on computer systems. Alternatively, the instructions, application programs, etc. may be stored in an external storage or available from a memory over a network. The one or more storage devices may be a volatile or non-volatile, magnetic, semiconductor, tape, optical, removable, non-removable, or other type of storage device or tangible computer-readable medium.

In one embodiment, authentication system 510 may include memory 630 that includes instructions that, when executed by processor 610, perform one or more processes consistent with the functionalities disclosed herein. Methods, systems, and articles of manufacture consistent with disclosed embodiments are not limited to separate programs or computers configured to perform dedicated tasks. For example, authentication system 510 may include memory 630 that may include one or more programs 650 to perform one or more functions of the disclosed embodiments. Moreover, processor 610 may execute one or more programs 650 located remotely from authentication system 510. For example, authentication system 510 may access one or more remote programs 650, that, when executed, perform functions related to disclosed embodiments.

Memory 630 may include one or more memory devices that store data and instructions used to perform one or more features of the disclosed embodiments. Memory 630 may also include any combination of one or more databases controlled by memory controller devices (e.g., server(s), etc.) or software, such as document management systems, Microsoft™ SQL databases, SharePoint™ databases, Oracle™ databases, Sybase™ databases, or other relational databases. Memory 630 may include software components that, when executed by processor 610, perform one or more processes consistent with the disclosed embodiments. In some embodiments, memory 630 may include an internal database 680 for storing a plurality of customer transaction data to authentication system 510 to perform one or more of the processes and functionalities associated with the disclosed embodiments.

Authentication system 510 may also be communicatively connected to one or more memory devices (e.g., databases (not shown)) locally or through a network. The remote memory devices may be configured to store information and may be accessed and/or managed by authentication system 510. By way of example, the remote memory devices may be document management systems, Microsoft™ SQL database, SharePoint™ databases, Oracle™ databases, Sybase™ databases, or other relational databases. Systems and methods consistent with disclosed embodiments, however, are not limited to separate databases or even to the use of a database.

Authentication system 510 may also include one or more I/O devices 620 that may include one or more interfaces for receiving signals or input from devices and providing signals or output to one or more devices that allow data to be received and/or transmitted by authentication system 510. For example, Authentication system 510 may include interface components, which may provide interfaces to one or more input devices, such as one or more keyboards, mouse devices, touch screens, track pads, trackballs, scroll wheels, digital cameras, microphones, sensors, and the like, that enable authentication system 510 to receive data from one or more users (e.g., customer device(s) 550). Additionally, I/O 620 may include the audiovisual recorder utilized for receiving a feedback based on the event attended by the user.

In example embodiments of the disclosed technology, authentication system 510 may include any number of hardware and/or software applications that are executed to facilitate any of the operations. The one or more I/O interfaces may be utilized to receive or collect data and/or user instructions from a wide variety of input devices. Received data may be processed by one or more computer processors as desired in various implementations of the disclosed technology and/or stored in one or more memory devices.

While authentication system 510 has been described as one form for implementing the techniques described herein, those having ordinary skill in the art will appreciate that other, functionally equivalent techniques may be employed. For example, as known in the art, some or all of the functionality implemented via executable instructions may also be implemented using firmware and/or hardware devices such as application specific integrated circuits (ASICs), programmable logic arrays, state machines, etc. Furthermore, other implementations of authentication system 510 may include a greater or lesser number of components than those illustrated.

Examples of the present disclosure relate to systems and methods for fraud detection and prevention. In one aspect, a system for fraud detection and prevention is disclosed. The system may implement a method according to the disclosed embodiments. The system may receive a transaction request associated with a first customer. The transaction request may include a transaction time stamp, a transaction location, and a merchant type code. The system may determine whether the transaction location includes an expected location for the first customer. When the transaction location does not include the expected location, the system may identify a last-known video detection for the first customer. The last known-video detection may include a last-known time stamp and a last-known location. The system may determine a travel time estimate between the last-known location and the transaction location. The system may determine a buffer based at least in part on the merchant type code. The system may compare the travel time estimate to an allotted time. The allotted time may include a difference between the transaction time stamp and the last-known time stamp less the buffer. Responsive to the travel time estimate exceeding the allotted time, the system may execute one or more fraud prevention steps.

In some embodiments, the one or more fraud prevention steps may include denying the transaction request and/or requesting a secondary authentication from a user device associated with the first customer, and/or issuing a fraud alert to stored contact information associated with the first customer.

In some embodiments, the last-known video detection may be based on a live video feed and the live feed is captured by one or more stationary cameras having a known location. Identifying the last-known video detection may further include receiving the live video feed and identifying the first customer or receiving the last-known video detection from a third party.

In some embodiments, determining the travel time includes determining a distance between the last-known location and the transaction location and comparing to the distance to a travel threshold. When the distance surpasses the travel threshold, the system may estimate a travel speed based on average flight speed data, and when the distance does not surpass the travel threshold, the system may estimate the travel speed based on vehicle traffic data.

In another aspect, a system for detecting and preventing fraud is disclosed. The system may implement a method according to the disclosed embodiments. The system may identify a first customer in a captured image. The captured image may include last-known location and a last-known time stamp. The system may receive a transaction request with the first customer. The transaction request may include a transaction time stamp, a transaction location, and a merchant type code. The system may determine a travel time estimate between the last-known location and the transaction location. The system may determine a buffer based at least in part on the merchant type code. The system may compare the travel time estimate to an allotted time. The allotted time may include a difference between the transaction time stamp and the last-known time stamp less the buffer. Responsive to the travel time estimate exceeding the allotted time, the system may deny the transaction request.

In some embodiments, identifying the first customer further includes capturing the captured image with one or more associated image capture devices and identifying the first customer within the captured image. The captured image may be received from one of a plurality of third-party video sources. The captured image may further include a live video feed and the live video feed may be captured by one or more stationary cameras having a known location.

In some embodiments, determining the travel time estimate may further include determining a distance between the last-known location and the transaction location and comparing the distance to a travel threshold. When the distance surpasses the travel threshold, the system may estimate a travel speed based on average flight speed data.

When the distance does not surpass the travel threshold, the system may estimate the travel speed based on vehicle traffic data.

In yet another aspect, a system for fraud detection and prevention is disclosed. The device may implement a method according to the disclosed embodiments. The system may receive a transaction request associated with a first customer. The transaction request may include a transaction time stamp, a transaction location, and a merchant type code. Responsive to receiving the transaction request, the system may identify a last-known video detection for the first customer. The last-known video detection may include a last-known time stamp and a last-known location. The system may determine a travel time estimate between the last-known location and the transaction location. The system may determine a buffer based at least in part on the merchant type code. The system may compare the travel time estimate to an allotted time. The allotted time may include a difference between the transaction time stamp and the last-known time stamp less the buffer. The system may determine that the travel time estimate exceeds the allotted time. When the travel time exceeds the allotted time by at least a first threshold, the system may execute a high threat response. When the travel time estimate exceeds the allotted time by at least a second threshold, the system may execute a medium threat response. When the travel time estimate exceeds the allotted time by less than the second threshold, the system may execute a low threat response.

In some embodiments, the high threat response includes denying the transaction and monitoring a first predetermined number of subsequent transaction request for the first customer.

In some embodiments, the medium threat response may include requesting a secondary authentication from a user device associated with the first customer and monitoring a second predetermined number of subsequent transaction requests for the first customer. The second predetermined number may be less than the first predetermined number.

In some embodiments, the low threat response may include monitoring a third predetermined number of subsequent transaction requests for the first customer. The third predetermined number may be less than the second predetermined number.

In some embodiments, determining the first and second predetermined numbers are based in part on determining by how much a respective first and second threshold has been exceeded by.

In some embodiments, identifying the last-known video detection may further include receiving the live video feed and identifying the first customer. The last-known video detection may be based on a live video feed and the live video feed may be captured by one or more stationary cameras having a known location.

Example Use Case

The following example use case describes an example of a use of the systems and methods for fraud detection and prevention described herein. It is intended solely for explanatory purposes and not to limit the disclosure in any way. In one example, a customer, who is a resident of New Jersey but works in New York City may make a transaction with a Merchant in Manhattan at 12:30 pm on a Monday afternoon. The system may receive the transaction request from a merchant POS system. The transaction request may include a transaction location (e.g., based on a known location associated with the merchant), a transaction time stamp, and a merchant type code. The merchant type code may provide reference that the system (e.g., authentication system 510) may use to determine the merchant type of the merchant. For example, based on the merchant type code, the system may determine that the customer has stopped for a coffee at a local coffee shop, or that the customer has made a purchase at a fine dining restaurant. Based on the merchant type code, the system may apportion a different amount of time for the customer to be in a non-traveling state. For example, when then merchant type code indicates that the customer has purchased a coffee at a coffee shop, the system may allocate only 15 minutes to represent an amount of time that the average customer spends in the coffee shop. Alternatively, for a fine dining restaurant, the system may allocate, e.g., 90 minutes to represent that the average customer spends much longer at a fine dining restaurant than at a coffee shop. Based on the transaction location and a previous history of transaction associated with the customer, the system may determine whether the location is expected. For the customer in the example, New York City may be an expected location because previous transaction history may show the customer having a history of making purchases within New York City and New Jersey. Accordingly, the system may approve such a transaction without further verification. However, supposing that New York City is not an expected location for the customer, the system may then use facial recognition techniques to identify the customer in a last-known video detection. The last-known video detection may be from a recording captured by a third-party image capture device (e.g., an ATM security camera associated with an ATM at which the customer withdrew money several hours before heading into New York City). In some cases, the recording may be captured by an image capture device associated with the system (e.g., authentication system 510) itself. Regardless, the system receives video feed in which the customer may be identified. The last-known location may be known to the system based on the static location of the fixed image capture device and/or third-party image capture device. The identification may include a last-known time stamp indicating when the customer was last seen in an image captured by one of the image capture devices and/or third-party image captures devices in the system. The system may then determine a distance between the transaction location and the last-known location to be used for calculating an estimated travel time. The estimated travel time is compared to the time difference between the two timestamps less a time based on non-travel activity, the time period calculated based on the merchant type code.

The specific configurations, machines, and the size and shape of various elements can be varied according to particular design specifications or constraints requiring customer devices 550, financial service provider(s) 560, authentication system 510, image capture device(s) 540, third party image capture device(s) 530, system 500, or methods 100, 200, 300, and 400 to be constructed according to the principles of this disclosure. Such changes are intended to be embraced within the scope of this disclosure. The presently disclosed examples, therefore, are considered in all respects to be illustrative and not restrictive. The scope of the disclosure is indicated by the appended claims, rather than the foregoing description, and all changes that come within the meaning and range of equivalents thereof are intended to be embraced therein.

As used in this application, the terms "component," "module," "system," "server," "processor," "memory," and the like are intended to include one or more computer-related units, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain examples and implementations of the disclosed technology are described above with reference to block and flow diagrams of systems and methods and/or computer program products according to example examples or implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some examples or implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

As an example, examples or implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Certain implementations of the disclosed technology are described above with reference to user devices may include mobile computing devices. Those skilled in the art recognize that there are several categories of mobile devices, generally known as portable computing devices that can run on batteries but are not usually classified as laptops. For example, mobile devices can include, but are not limited to portable computers, tablet PCs, internet tablets, PDAs, ultra-mobile PCs (UMPCs), wearable devices, and smart phones. Additionally, implementations of the disclosed technology can be utilized with internet of things (IoT) devices, smart televisions and media devices, appliances, automobiles, toys, and voice command devices, along with peripherals that interface with these devices.

In this description, numerous specific details have been set forth. It is to be understood, however, that implementations of the disclosed technology may be practiced without these specific details. In other instances, well-known methods, structures, and techniques have not been shown in detail in order not to obscure an understanding of this description. References to "one embodiment," "an embodiment," "some examples," "example embodiment," "various examples," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form. By "comprising," "containing," or "including" it is meant that at least the named element, or method step is present in article or method, but does not exclude the presence of other elements or method steps, even if the other such elements or method steps have the same function as what is named.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

While certain examples of this disclosure have been described in connection with what is presently considered to be the most practical and various examples, it is to be understood that this disclosure is not to be limited to the disclosed examples, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain examples of the technology and also to enable any person skilled in the art to practice certain examples of this technology, including making and using any apparatuses or systems and performing any incorporated methods. The patentable scope of certain examples of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

It is also to be understood that the mention of one or more method steps does not imply a particular order of operation or preclude the presence of additional method steps or intervening method steps between those steps expressly identified. Similarly, it is also to be understood that the mention of one or more components in a device or system does not preclude the presence of additional components or intervening components between those components expressly identified.

What is claimed is:

1. A fraud detection and prevention system comprising:
   one or more processors;
   a memory in communication with the one or more processors and storing instructions that, when executed by the one or more processors, are configured to cause the system to:
      receive a transaction request associated with a first customer, the transaction request comprising a transaction time stamp, a transaction location, and a merchant type code;
      determine, using a trained machine learning algorithm, whether the transaction request is a card present transaction or a card not present transaction;
      responsive to determining that the transaction request is a card present transaction, determine whether the transaction location is an expected location for the first customer;
      when the transaction location is the expected location, allow the transaction; and
      when the transaction location is not the expected location:
         receive or retrieve image data captured by one or more image capture devices;
         identify, using facial recognition techniques, the first customer from the image data at a last-known video detection point, the last-known video detection point comprising a last-known time stamp and a last-known location;
         determine a travel time estimate between the last-known location and the transaction location;
         determine a buffer based at least in part on the merchant type code;
         compare the travel time estimate to an allotted time comprising a difference between the transaction time stamp and the last-known time stamp less the buffer; and
         responsive to the travel time estimate exceeding the allotted time, execute one or more fraud prevention steps.

2. The system of claim 1, wherein the one or more fraud prevention steps comprises:
- denying the transaction request;
- requesting a secondary authentication from a user device associated with the first customer;
- issuing a fraud alert to stored contact information associated with the first customer; or
- combinations thereof.

3. The system of claim 1, wherein determining whether the transaction location comprises an expected location for the first customer further comprises:
- comparing the transaction location with previous transaction locations over a predetermined period.

4. The system of claim 1, wherein identifying the first customer from the image data at a last-known video detection point further comprises:
- analyzing, using image-recognition techniques, a government-issued identification image of the first customer; and
- determining, using image comparison algorithms, whether the government-issued identification image matches the image data at the last-known video detection point above a predetermined threshold.

5. The system of claim 1, wherein the image data is based on a live video feed and the live video feed is captured by one or more stationary cameras having a known location.

6. The system of claim 1, wherein the image data is received from a third-party image capture device.

7. The system of claim 1, wherein the image data is retrieved from stored past image data.

8. The system of claim 1, wherein determining the travel time estimate further comprises:
- determining a distance between the last-known location and the transaction location;
- comparing the distance to a travel threshold;
- when the distance surpasses the travel threshold, estimate a travel speed based on average flight speed data; and
- when the distance does not surpass the travel threshold, estimate the travel speed based on vehicle traffic data.

* * * * *